(12) United States Patent
Baltikas

(10) Patent No.: US 10,587,102 B2
(45) Date of Patent: Mar. 10, 2020

(54) TOOL FOR INSTALLING SEALING BOOT ON CABLE

(71) Applicant: CommScope Technologies LLC, Hickory, NC (US)

(72) Inventor: Joseph J. Baltikas, Homer Glen, IL (US)

(73) Assignee: CommScope Technologies LLC, Hickory, NC (US)

( * ) Notice: Subject to any disclaimer, the term of this patent is extended or adjusted under 35 U.S.C. 154(b) by 797 days.

(21) Appl. No.: 14/985,948

(22) Filed: Dec. 31, 2015

(65) Prior Publication Data

US 2016/0204585 A1 Jul. 14, 2016

Related U.S. Application Data

(60) Provisional application No. 62/103,412, filed on Jan. 14, 2015.

(51) Int. Cl.
*H02G 1/14* (2006.01)
*H02G 15/04* (2006.01)

(52) U.S. Cl.
CPC ............ *H02G 1/14* (2013.01); *H02G 15/046* (2013.01)

(58) Field of Classification Search
CPC . H02G 15/085; H02G 15/18–196; H02G 1/14
USPC .......... 29/828, 868–873, 874, 883, 876, 728
See application file for complete search history.

(56) References Cited

U.S. PATENT DOCUMENTS

| | | | | | |
|---|---|---|---|---|---|
| 2,837,353 | A | * | 6/1958 | Ashbrook | F16L 19/06 285/106 |
| 3,802,071 | A | * | 4/1974 | Shannon | H01R 43/22 29/863 |
| 4,053,195 | A | * | 10/1977 | Laverick | H01R 13/6397 439/308 |
| 4,173,385 | A | * | 11/1979 | Fenn | H01R 9/05 439/277 |
| 4,440,424 | A | * | 4/1984 | Mode | B21D 53/16 285/238 |
| 4,508,369 | A | * | 4/1985 | Mode | B21D 53/16 285/105 |
| 4,712,811 | A | * | 12/1987 | Wier | F16L 37/092 285/113 |
| 4,829,845 | A | * | 5/1989 | Suzuki | F16C 1/103 188/196 D |
| 5,222,169 | A | * | 6/1993 | Chang | G02B 6/3869 385/87 |
| 5,315,757 | A | * | 5/1994 | Koch | H01R 43/005 29/743 |
| 5,640,476 | A | * | 6/1997 | Womack | G02B 6/4478 385/76 |
| 5,694,507 | A | * | 12/1997 | Walles | G02B 6/3825 385/60 |
| 5,886,294 | A | * | 3/1999 | Scrimpshire | G02B 6/3887 174/359 |

(Continued)

*Primary Examiner* — Peter Dungba Vo
*Assistant Examiner* — Kaying Kue
(74) *Attorney, Agent, or Firm* — Myers Bigel, P.A.

(57) ABSTRACT

A tool for facilitating the installation of a sealing boot on a cable includes: an arcuate main body having a tapered end, the main body having axially-disposed edges that define a gap therebetween, the main body defining a bore; and a gripping portion attached to an end of the main body opposite the tapered end, the gripping portion extending radially outwardly from the main body.

10 Claims, 4 Drawing Sheets

(56) References Cited

U.S. PATENT DOCUMENTS

| | | | | |
|---|---|---|---|---|
| 6,273,733 B1* | 8/2001 | Uchiyama | ............... | H01T 13/04 |
| | | | | 439/125 |
| 6,799,773 B2* | 10/2004 | Kao | ............ | B62J 1/08 |
| | | | | 280/281.1 |
| 6,929,265 B2* | 8/2005 | Holland | ............... | F16L 37/138 |
| | | | | 174/652 |
| 7,413,543 B2* | 8/2008 | Banik | ................ | A61B 1/04 |
| | | | | 600/129 |
| 7,618,098 B2* | 11/2009 | Frear | ................ | E21C 35/197 |
| | | | | 299/102 |
| 7,664,363 B1* | 2/2010 | Mowery, Sr. | ......... | G02B 6/3887 |
| | | | | 385/137 |
| D646,227 S * | 10/2011 | Natoli | ............. | D13/156 |
| 8,337,228 B1* | 12/2012 | Montena | ............ | H01R 13/5219 |
| | | | | 277/609 |
| 9,216,530 B2* | 12/2015 | Vaccaro | ............... | H02G 15/013 |
| 9,507,097 B2* | 11/2016 | Harwath | ............... | G02B 6/387 |
| 9,608,361 B2* | 3/2017 | Vaccaro | ............ | H01R 13/5205 |
| 2004/0245730 A1* | 12/2004 | Holland | ............... | F16L 37/138 |
| | | | | 277/602 |
| 2005/0287873 A1* | 12/2005 | Carroll | ............... | H01R 13/6463 |
| | | | | 439/676 |
| 2010/0248533 A1* | 9/2010 | Montena | ............ | H01R 13/5213 |
| | | | | 439/521 |
| 2012/0131774 A1* | 5/2012 | Takahashi | ............. | B60K 15/05 |
| | | | | 24/611 |
| 2013/0112475 A1* | 5/2013 | Magno, Jr. | ............ | H02G 15/013 |
| | | | | 174/77 R |
| 2015/0017827 A1 | 1/2015 | Vaccaro | | |
| 2015/0136439 A1* | 5/2015 | Vaccaro | ............... | H02G 3/0487 |
| | | | | 174/91 |

* cited by examiner

TOOL FOR INSTALLING SEALING BOOT ON CABLE

RELATED APPLICATION

This application claims priority from and the benefit of U.S. Provisional Patent Application No. 62/103,412, filed Jan. 14, 2015, the disclosure of which is hereby incorporated herein by reference.

FIELD OF THE INVENTION

The present invention relates generally to a tool used with a device for environmentally sealing and securing the interconnection between electrical cables and electronic equipment.

BACKGROUND

Interconnection junctions, such as the interconnection between two cables or a cable and a piece of electronic equipment, may be subject to degradation from environmental factors such as moisture, vibration and repeated expansion and contraction from daily temperature changes. Outer sealing enclosures that surround or enclose an electrical interconnection have been used to protect such interconnections. Enclosures often apply rigid clamshell configurations that, once closed, may be difficult to open, especially when installed in exposed or remote locations, such as atop radio towers; gaskets or gel seals may be applied at the enclosure ends and/or along a sealing perimeter of the shell.

Elastic interconnection seals are also known. Elastic seals can be advantageous by virtue of being more easily installed over the typically uneven contours of an electrical interconnection. Exemplary configurations are described in U.S. patent application Ser. Nos. 13/646,952, filed Oct. 8, 2012; 13/938,475, filed Jul. 10, 2013; and 14/245,443, filed Apr. 4, 2014, the disclosures of each of which are hereby incorporated by reference herein.

SUMMARY

As a first aspect, embodiments of the invention are directed to a tool for facilitating the installation of a sealing boot on a cable. The tool comprises: an arcuate main body having a tapered end, the main body having axially-disposed edges that define a gap therebetween, the main body defining a bore; and a gripping portion attached to an end of the main body opposite the tapered end, the gripping portion extending radially outwardly from the main body.

As a second aspect, embodiments of the invention are directed to a method of facilitating installation of a sealing boot on a cable. The method comprises the steps of: (a) providing a tool comprising an arcuate main body having a tapered end, the main body having axially-disposed edges that define a gap therebetween, the main body defining a bore and a gripping portion attached to an end of the main body opposite the tapered end, the gripping portion extending radially outwardly from the main body; (b) inserting the tapered end of the tool into an annular portion of a sealing boot; (c) routing a cable though the annular portion of the sealing boot and the bore in the main body of the tool; (d) adjusting the position of the sealing boot and the tool relative to the cable; and (e) removing the tool from the sealing boot such that the sealing boot remains in a desired position relative to the cable.

DETAILED DESCRIPTION OF EMBODIMENTS OF THE INVENTION

The present invention is described with reference to the accompanying drawings, in which certain embodiments of the invention are shown. This invention may, however, be embodied in many different forms and should not be construed as limited to the embodiments that are pictured and described herein; rather, these embodiments are provided so that this disclosure will be thorough and complete, and will fully convey the scope of the invention to those skilled in the art. It will also be appreciated that the embodiments disclosed herein can be combined in any way and/or combination to provide many additional embodiments.

Unless otherwise defined, all technical and scientific terms that are used in this disclosure have the same meaning as commonly understood by one of ordinary skill in the art to which this invention belongs. The terminology used herein is for the purpose of describing particular embodiments only and is not intended to be limiting of the invention. As used in this disclosure, the singular forms "a", "an" and "the" are intended to include the plural forms as well, unless the context clearly indicates otherwise. It will also be understood that when an element (e.g., a device, circuit, etc.) is referred to as being "connected" or "coupled" to another element, it can be directly connected or coupled to the other element or intervening elements may be present. In contrast, when an element is referred to as being "directly connected" or "directly coupled" to another element, there are no intervening elements present.

Figure 1:
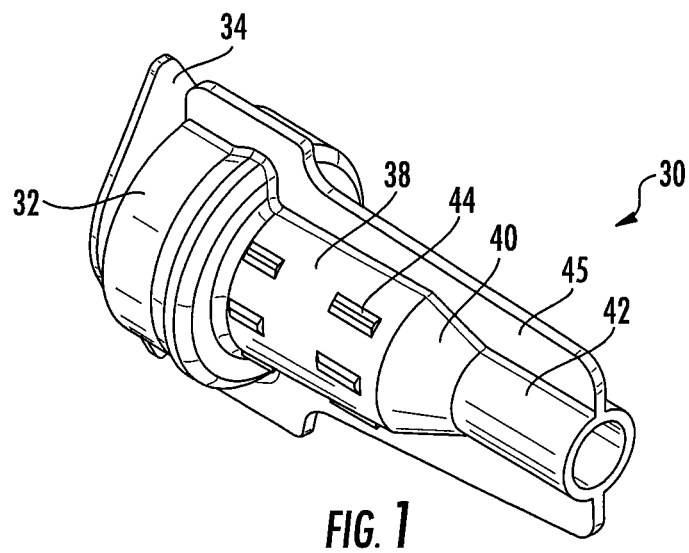
FIG. 1 is a perspective view of a sealing boot to be used to seal a connector interface according to embodiments of the invention.
Figure 2:
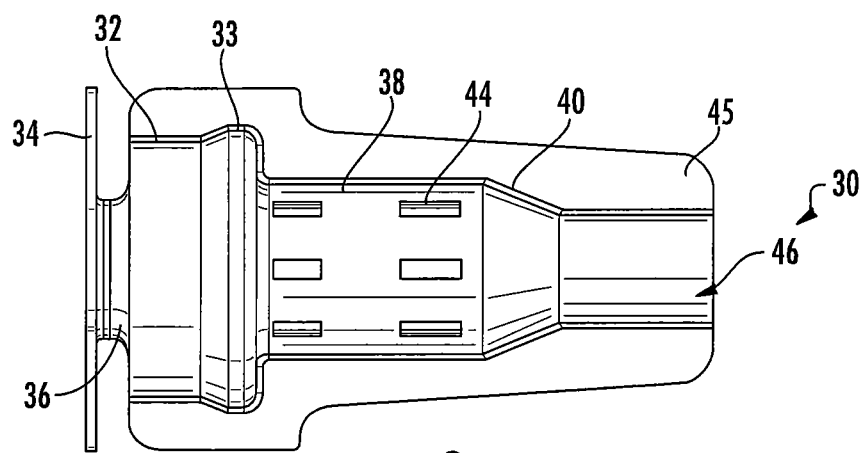
FIG. 2 is a front view of the sealing boot of FIG. 1.
Figure 3:
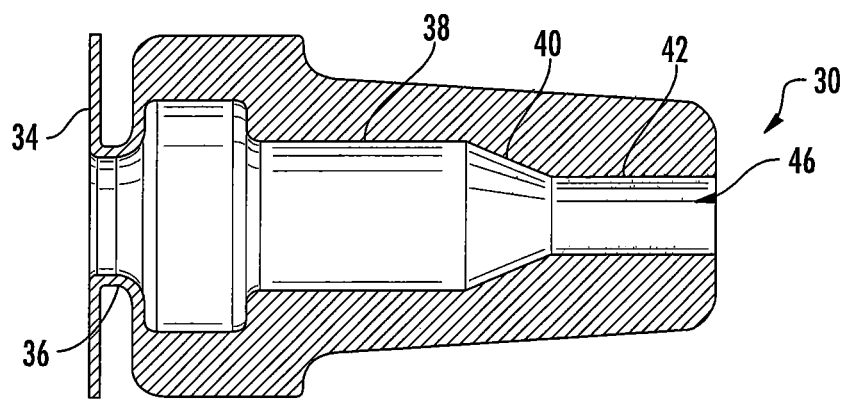
FIG. 3 is a front section view of the cover of FIG. 1.

Referring now to the figures, a sealing boot (designated broadly at 30) to protect an interconnection of coaxial or other electrical connectors is shown in FIGS. 1-3. The boot 30 includes a generally cylindrical interconnection section 32 with a circumferential projection 33. A diamond-shaped flange 34 is mounted to the interconnection section 32 via a short trunk 36. A generally cylindrical main section 38 merges with the interconnection section 32 opposite the trunk 36. The main section 38 is smaller in diameter than the interconnection section 32. A tapered transition section 40 merges with the main section 38; in turn, a generally cylindrical cable section 42 merges with the transition section 40. The boot 30 also includes two opposed axially-extending fins 45 that project radially outwardly and three axial ribs 44 between the fins 45 on each side. Thus, the hollow, generally coaxial sections of the boot 30 define a continuous bore 46. The cable section 42 is configured to fit over the jacket of a cable, and is sized so that it fits sufficiently snugly and conformably over the cable for form a watertight seal therewith.

The boot 30 may be formed of any number of materials, but is typically formed of an elastomeric material, such as rubber, that can recover to its original shape after significant deformation. The boot 30 is typically formed as a unitary member, and in particular may be formed via injection molding.

One issue that can arise with a sealing boot 30 such as that shown in FIGS. 1-3 is the installation and movement of the boot 30 relative to the cable and connector into a desired position. As noted, the sealing boot 30 is typically sized so that the cable section 42 must stretch in order to fit around the cable (which, of course, enables the boot to create a seal when the stretched cable section 42 relaxes). As such, friction between the cable section 42 and the cable jacket can make the position of the boot difficult to adjust, and may in some instances require more than one person.

Figure 4:
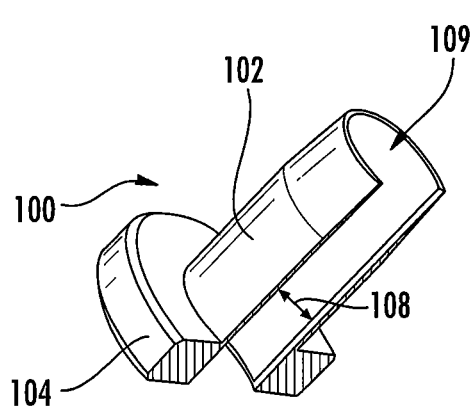
FIG. 4 is a perspective view of a tool to facilitate installation of the sealing boot of FIG. 1 onto a cable according to embodiments of the invention.

Referring now to FIG. 4, a tool for assisting in the installation of the boot 30 onto a cable, designated broadly at 100, is shown therein. The tool 100 includes a main body 102 and a gripping portion 104. The main body 102 is arcuate in cross-section, describing an arc of approximately 225 degrees, and has a tapered end 106. The axially-disposed edges of the main body 102 define a gap 108, and the main body 102 itself defines an internal bore 109. The gripping portion 104 extends radially outwardly from the end of the main body 102 opposite the tapered end 106.

The tool 100 can be formed of any material, but is typically formed of a thermoplastic material such as polystyrene or ABS. The tool 100 is typically formed as a monolithic component.

Figure 5:
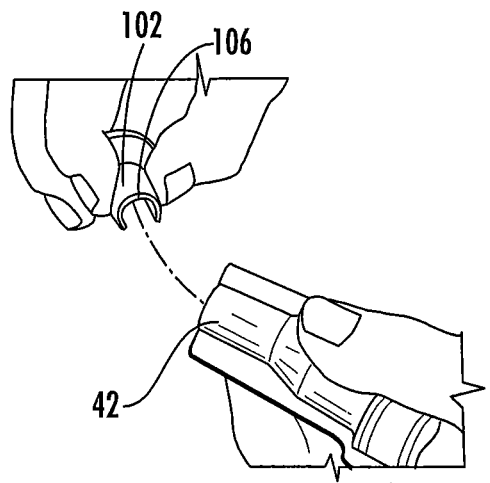
FIGS. 5-10 are sequential views illustrating the use of the tool of FIG. 4 in the installation of the sealing boot of FIGS. 1-3 onto a cable.
Figure 6:
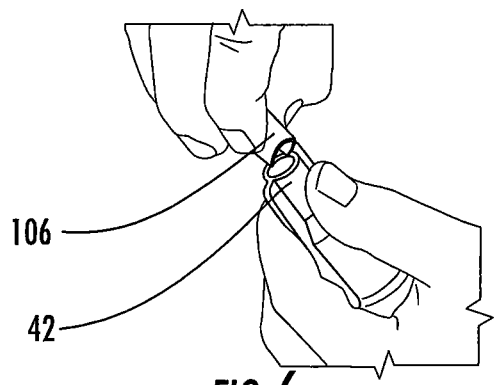
Figure 7:
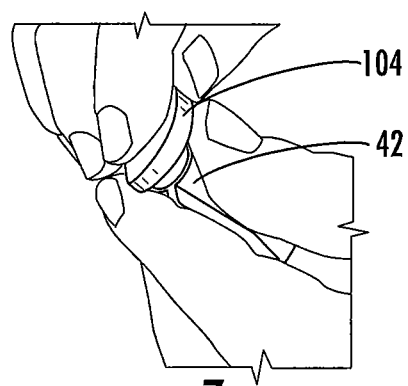
Figure 8:
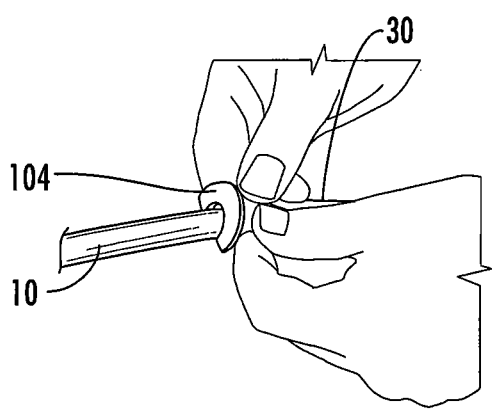
Figure 9:
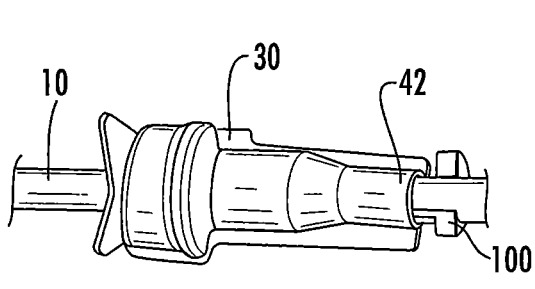
Figure 10:
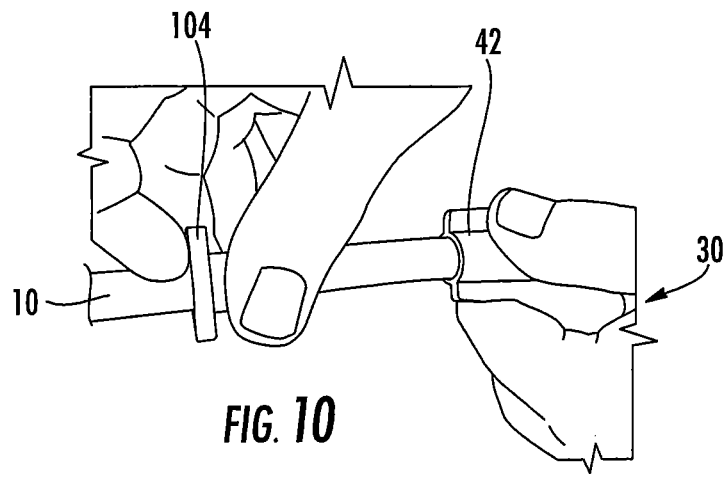

In operation, the tapered end 106 of the tool 100 is inserted into the cable section 42 of the boot 30, with the gripping portion 104 adjacent the end of the cable section 42 (FIGS. 5-7). Insertion is facilitated by pinching the edges of the main body 102 to draw them toward each other (thereby narrowing the gap 108) during insertion. Once inserted and permitted to relax (FIG. 7), the main body 102 of the tool 100 is sufficient large in outer diameter that it stretches the cable section 42 radially outwardly. The boot 30 and tool 100 can then be slipped over the end of a cable 10 (FIG. 8), with the cable 10 fitting within the bore 109 of the tool 100. The inner diameter of the main body 102 is slightly larger than the outer diameter of the jacket of the cable 10. As such, the tool 100 can slide easily relative to the cable 10 (FIG. 9), thereby positioning the boot 30 relative to the cable 10 as desired. Once the boot 30 is in the desired location, the tool 100 can be slipped out of the cable section 42 (typically by manipulating the gripping portion 104—see FIG. 10) and slipped off of the cable 10 (which can pass through the gap 108 in the main body 102).

The boot 30 and tool 100 may be installed onto a cable that includes no connector (as is the case with the cable 10—see FIGS. 5-10). Once the connector is added, the boot 30 and tool 100 remain on the cable 10. When the connector is mated with another connector, the tool 100 can be used to slide the boot 30 into position to seal the mated interface. The tool 100 can then be removed from the boot 30 and either retained with the cable 10 (e.g., for subsequent maintenance of the interface) or removed from the cable 10.

Figure 11:
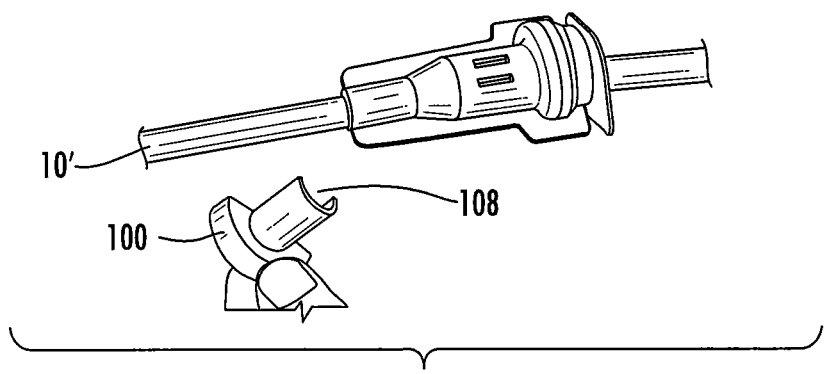
FIGS. 11-13 are sequential views showing use of the tool of FIG. 4 after a sealing boot has already been installed on a cable.
Figure 12:
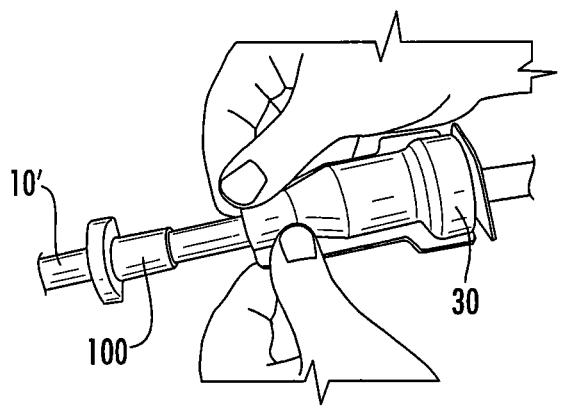
Figure 13:
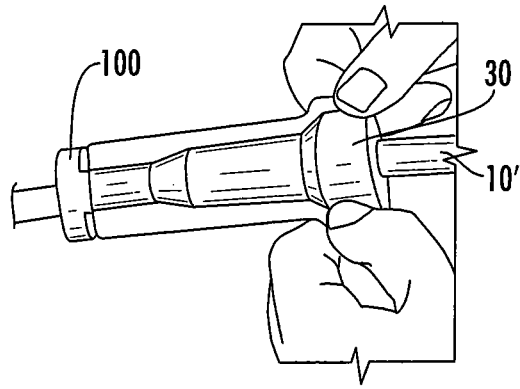

In other embodiments, a cable 10' may have a connector already attached to it along with a sealing boot installed (see FIG. 11). In such instances, the tool 100 may be snapped onto the cable 10' (using the gap 108 in the main body 102—see FIGS. 11 and 12). Once on the cable 10, the tool 100 is inserted into the boot 30 to assist with positioning of the boot 30 (FIG. 13).

Figure 14:
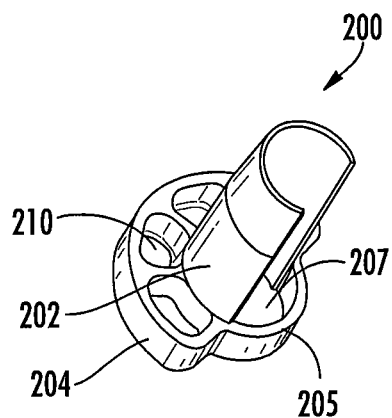
FIG. 14 is a perspective view of a tool to facilitate installation of the sealing boot of FIG. 1 onto a cable according to alternative embodiments of the invention.
Figure 15:
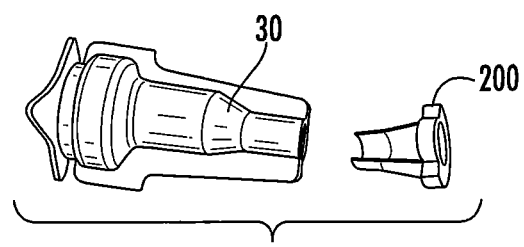
FIGS. 15-17 are sequential views illustrating the use of the tool of FIG. 14 in the installation of the sealing boot of FIGS. 1-3 onto a cable.
Figure 16:
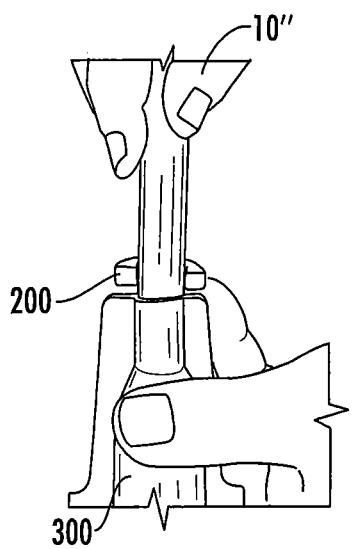
Figure 17:
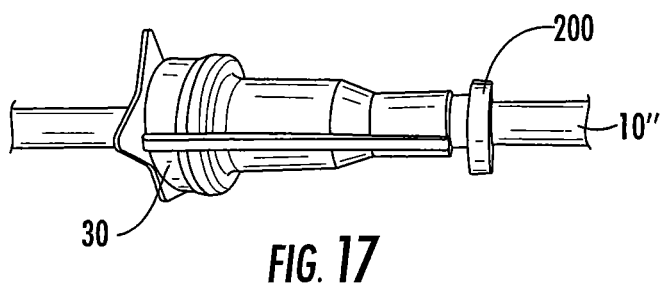

An additional embodiment of a tool is shown in FIG. 14 and designated broadly at 200. The tool 200 is identical to the tool 100 with the exception that the main body 202 includes an arced segment 205 that combines with the gripping portion 204 to form a complete ring 207, and that the gripping portion 204 includes recesses 210 that can reduce the weight of the tool 200 and improve manufacturability. The tool 200 can be employed as described above for use with a cable 10" prior to termination with a connector (see FIGS. 15-17) in the manner discussed with respect to FIGS. 5-10. The presence of the ring 207 retains the tool 200 with the boot 30 and cable 10" after installation without concern for the tool 200 becoming dislodged from the cable.

Those of skill in this art will appreciate that the tools 100, 200 may take different forms. For example, the main body 102 may include holes or slots that may facilitate flexure: as a specific example, the main body 102 may include longitudinal slots open at the tapered end 106, such that the main body 102 has multiple "fingers" that can flex upon insertion into the sealing boot. Also, the gripping portion 104 may define a larger or smaller arc than that shown, and/or may be circumferentially discontinuous. Other variations may also be possible.

Those skilled in this art will also appreciate that other varieties of sealing boots may also be installed with the tools described herein.

The foregoing is illustrative of the present invention and is not to be construed as limiting thereof. Although exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

That which is claimed is:

1. A method of facilitating installation of a sealing boot on a cable, comprising the steps of:
   (a) providing a tool comprising:
   an arcuate main body having a tapered end, the main body having axially-disposed edges extending a length of the main body that define a gap therebetween, the main body defining a bore; and
   a gripping portion attached to an end of the main body opposite the tapered end, the gripping portion extending radially outwardly from the main body;
   (b) inserting the tapered end of the tool into an annular portion of a sealing boot;
   (c) routing a cable though the annular portion of the sealing boot and the bore in the main body of the tool;
   (d) adjusting a position of the sealing boot and the tool relative to the cable; and
   (e) removing the tool from the sealing boot such that the sealing boot remains in a desired position relative to the cable.

2. The method defined in claim 1, wherein the removing the tool from the sealing boot further comprises detaching the tool from the cable.

3. The method defined in claim 1, wherein the removing the tool from the sealing boot comprises retaining the tool on the cable.

4. The method defined in claim 1, wherein the tool further comprises an arced segment that merges with the gripping portion to form a ring, and wherein the ring retains the tool on the cable.

5. The method defined in claim 1, wherein step (b) precedes step (c), such that the cable is routed through the tool and the sealing boot simultaneously.

6. The method defined in claim 1, wherein step (b) is performed after step (c).

7. The method defined in claim 1, wherein the desired position of step (e) positions the sealing boot over a connector attached to an end of the cable.

8. The method defined in claim 1, wherein step (b) comprises pinching the main body such that the axially-disposed edges are drawn toward each other, thereby enabling insertion of the main body into the annular portion of the sealing boot.

9. The method defined in claim 1, wherein step (d) comprises manipulating the tool with the gripping portion.

10. The method defined in claim 1, wherein the performance of step (e) results in a cable section of the sealing boot conformably fitting over a portion of the cable.

* * * * *